United States Patent [19]
Altman et al.

[11] 4,112,838
[45] Sep. 12, 1978

[54] HALVING AND CALYX REMOVING APPARATUS FOR PEARS AND THE LIKE

[76] Inventors: James E. Altman; Eston Altman, both of Gray, Ga. 31032

[21] Appl. No.: 698,849

[22] Filed: Jun. 23, 1976

[51] Int. Cl.² .......................................... A23N 15/02
[52] U.S. Cl. ........................................ 99/546; 99/548
[58] Field of Search ................. 99/537, 538, 542–550, 99/552, 539; 30/113.1, 113.2, 113.3; 83/285

[56] References Cited

U.S. PATENT DOCUMENTS

| 86,045 | 1/1969 | Vaughn | 30/113.3 |
|---|---|---|---|
| 2,681,088 | 6/1954 | Krupp | 99/544 |
| 3,057,239 | 10/1962 | Teplitz | 83/285 |
| 3,712,165 | 1/1973 | Meyer | 83/285 |
| 3,738,257 | 6/1973 | Manfre | 99/544 |

*Primary Examiner*—Peter Feldman
*Assistant Examiner*—Robert Pous
*Attorney, Agent, or Firm*—Hill, Gross, Simpson, Van Santen, Steadman, Chiara & Simpson

[57] ABSTRACT

A blade assembly which, during a single cycle of reciprocation, both halves a pear or the like and cuts out the calyx or equivalent portion thereof. This assembly is shown employed in apparatus which automatically and sequentially functions to halve and remove the calyx from a plurality of pears or the like. Control means is also provided for synchronizing reciprocations of a blade assembly (or a gang of blade assemblies) relative to each of a successive plurality of continuously moving pears or the like.

10 Claims, 10 Drawing Figures

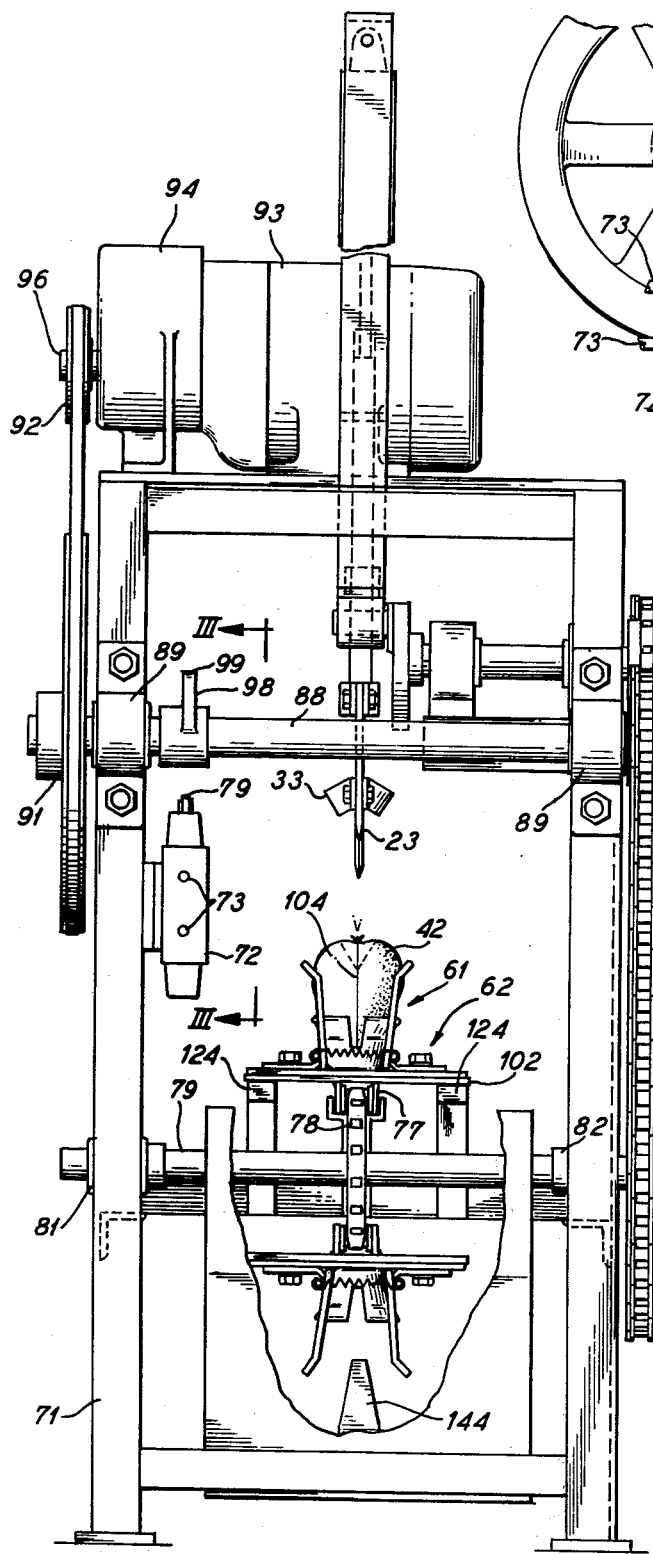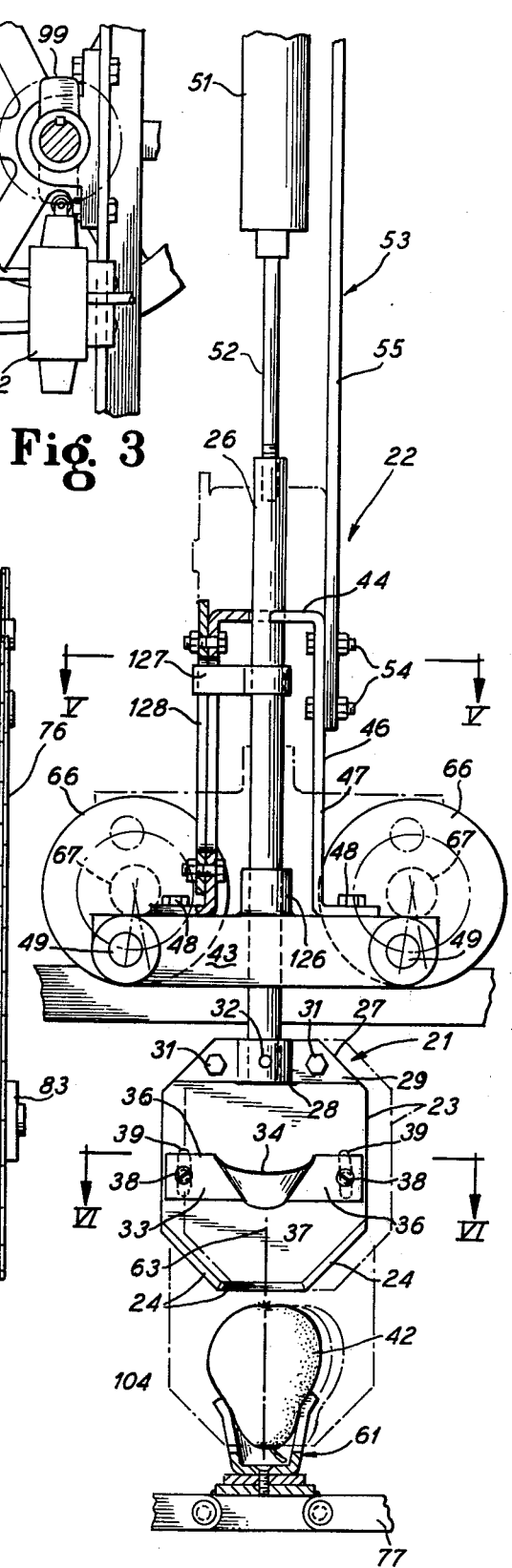
Fig. 2
Fig. 3
Fig. 4

HALVING AND CALYX REMOVING APPARATUS FOR PEARS AND THE LIKE

BACKGROUND OF THE INVENTION

In the processing of certain fruits, such as, for example, in the preparation of pears for drying, it has heretofore been necessary to utilize hand labor for preliminary processing. Thus, in the example, pears being prepared for drying have had their calyx portions removed and the pears have been split into halves with hand labor.

So far as is now known to us, no one has heretofore succeeded in producing machinery adapted to automatically and sequentially remove the calyx regions and substantially simultaneously halve pears.

BRIEF SUMMARY OF THE INVENTION

In one aspect, the present invention is directed to a blade assembly adapted to halve pears and the like, and in the same operation, removed the individual calyx or equivalent portions thereof.

In another aspect, the present invention relates to power driven cutting apparatus incorporating at least one blade assembly of the type above indicated.

In another aspect, the present invention relates to a process for halving a pear or the like while removing the calyx or equivalent portion thereof.

In another aspect, the present invention relates to apparatus for synchronizing reciprocations of a plunger shaft, such as a plunger shaft associated with a blade assembly of the type contemplated by the present invention, relative to each of a plurality of continuously moving target regions, such as each of a plurality of pears or the like, moving sequentially through positions of general alignment with the axis of reciprocation of such shaft.

In another aspect, the present invention relates to apparatus for the automatic, sequential continuous longitudinal halving of a plurality of pears, and for the concurrent removal therefrom of the calyx portions thereof, or for the similar treatment of other fruit.

In another aspect, the present invention relates to a process for automatically, continuously and sequentially halving of pears and the like, and for concurrently the calyx portions therefrom using for each pear or the like, a single blade assembly.

A primary object of the present invention is to provide a simple, effective, reliable technique, and class of mechanism with sub-assemblies useful therein, which will avoid the necessity to use hand labor in the preparation of fruit, such as pears, and the like, for use in a subsequent drying operation, or the like, such a preparation involving the halving of such fruit and the concurrent removal therefrom of the calyx or equivalent portions thereof.

Other and further objects, aims, advantages, uses, purposes, and the like will be apparent to those skilled in the art from the present invention taken with the accompanying drawings.

BRIEF DESCRIPTION OF DRAWINGS

In the drawings:

FIG. 2 is an end elevational view taken along the line II—II of FIG. 1, some parts thereof broken away;

FIG. 3 is a fragmentary vertical sectional view taken along the lin III—III of FIG. 2, some parts thereof broken away and some parts thereof shown in section;

FIG. 4 is a fragmentary vertical sectional view taken along the line IV—IV of FIG. 1, some parts thereof broken away, and some parts thereof shown in section;

DETAILED DESCRIPTION

Figure 1:
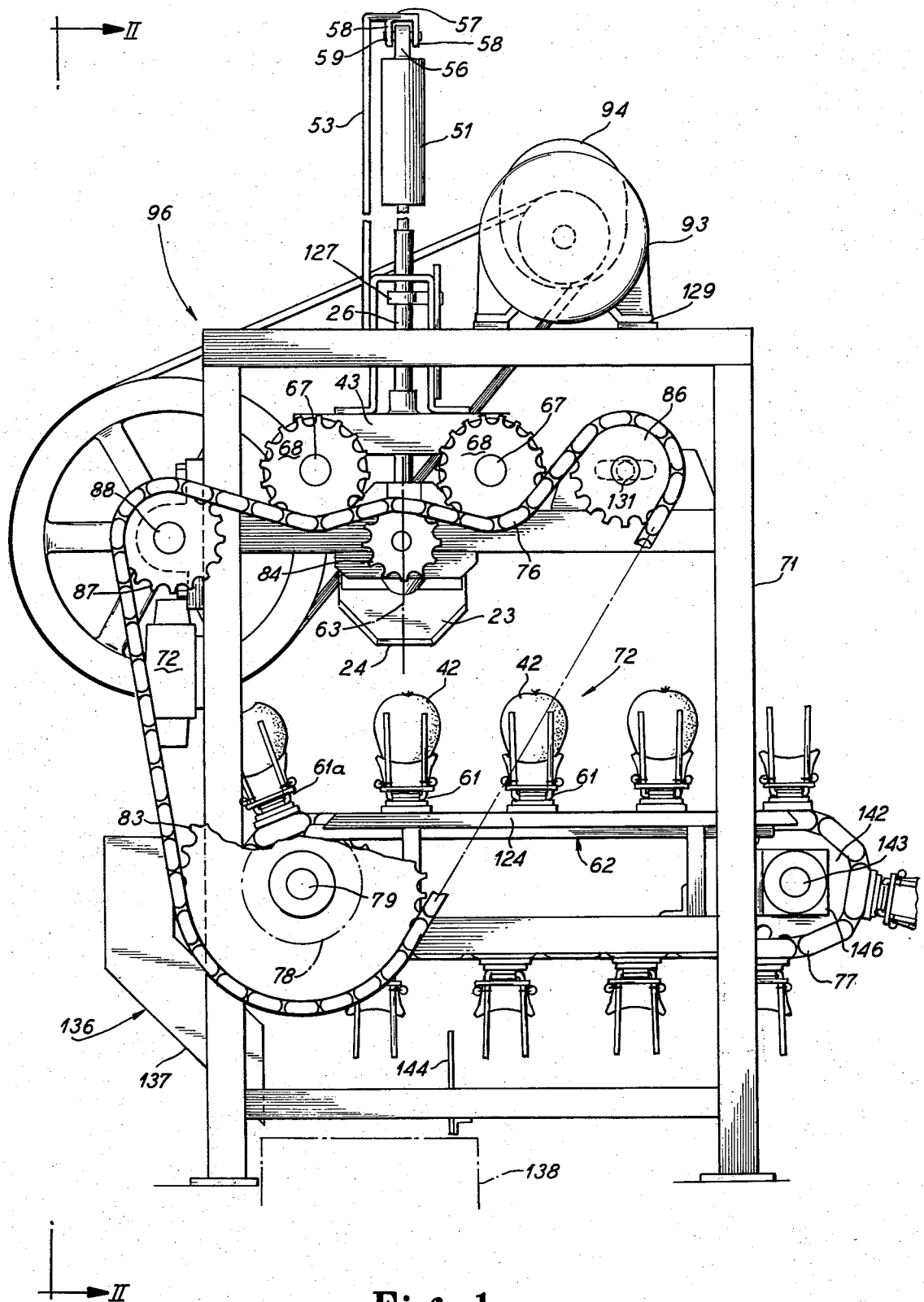
FIG. 1 is a side elevational view of one embodiment of halving and calyx removing apparatus of the present invention, some parts thereof broken away.
Figure 5:
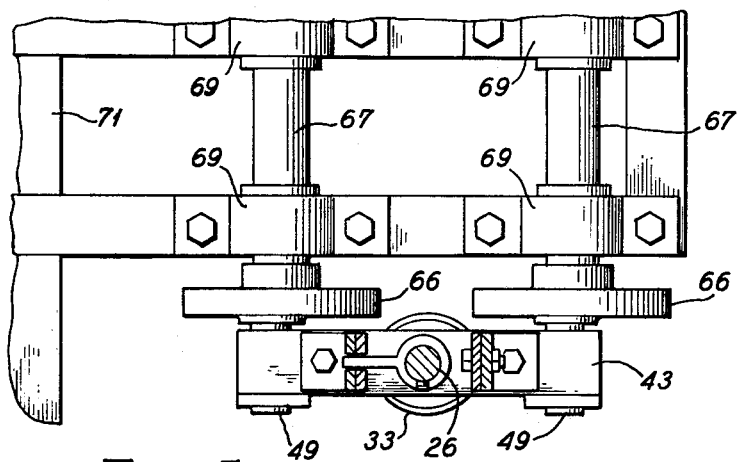
FIG. 5 is a fragmentary horizontal sectional view taken along the line V—V of FIG. 4, some parts thereof broken away, and some parts thereof shown in section.
Figure 6:
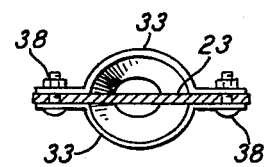
FIG. 6 is a fragmentary horizontal sectional view taken along the line VI—VI of FIG. 4.

Referring first for convenience to FIG. 4, there is seen one embodiment of a blade assembly of the present invention which is herein designated in its entirety by the numeral 21. Blade assembly 21 is adapted for incorporation into a halving and calyx removing apparatus herein designated in its entirety by the numeral 22. Apparatus 22 is adapted for the halving of fruit, such as pears and the like, and for the simultaneous removal therefrom of the calyx portions thereof, as will be hereinafter explained.

Blade assembly 21 incorporates a rigid, flattened blade member 23 having a cutting edge portion 24 along at least one side thereof. In the preferred blade member 23 shown, the cutting edge portion 24 has a central bottom portion and slanting portions joining each side edge of the bottom portion, as shown.

Blade member 23 has associated therewith a shaft 26 which here upwardly extends from a side of blade member 23 opposed to side having cutting edge portion 24, shaft 26 having an axis 63 which is positioned generally in the plane defined by the blade member 23. Shaft 26 is associated with blade member 23 by the following means: A slot 28 is centrally formed in the top edge 27 of blade member 23, and the lower end of shaft 26 is nested therein. A pair of appropriately shaped clamps 29 are positioned in opposed relationship to one another on each side of blade member 23 adjacent top edge 27 with the shaft 26 therebetween. The clamps 29 are mounted to blade member 23 by nut and bolt assemblies 31 (paired). A pin 32 is extended transversely through one clamp 29, through shaft 26 and into the other clamp 29, thereby preventing rotational movement of blade member 23 relative to the shaft 26. Any convenient arrangement may be employed to mount shaft 26 to blade member 23.

Blade assembly 21 is provided with a pair of sheet-like members 33. Each such member 33 has a hemi-conically tapered section 34 formed in a mid region thereof.

Such section 34 is so-arranged in each sheet member 33 so as to have a pair of tabs 36 integral therewith extending therefrom, here outwardly.

Any convenient mounting means is associated with the tabs 36 so as to position each of the members 33 in opposed relationship to one another with the respective tapered sections 34 defining together a full conical region with the blade member 23 extending transversely between the sheet-like members 33. The blade member 23 is oriented relative to members 33 with the edge portion 24 thereof in adjacent, spaced relationship to the small mouth 37 of the conical section defined by tapered sections 34. In preferred blade assembly 21, blade member 23 is provided with slots 39 (paired), each slot 39 being adjacent a different lateral side of blade member 23 and, through each slot 39, the bolt portion of a nut and bolt assembly 38 (paired) extends between the opposed tab pairs 36 of respective sheet members 33, thereby permitting one to adjust the relative positions of the hemi-conically tapered sections 34 so as to achieve a desired spaced relationship to cutting edge portions 24. The small nouth 37, and the opposed large mouth 41, of the conical region defined by the tapered sections 34 are sized in diameters respectively so as to conform to the dimensions associated with the fruit material which it is intended to remove (cut away) from a fruit piece, such as a pear 42 or the like, as this invention is being practiced.

Blade assembly 21 is further provided with guidance means allowing reciprocal movements of the blade member 23 generally in the plane defined thereby in a direction generally transverse to edge portion 24. Any convenient guidance means can be employed. In blade assembly 21, for example, shaft 26 is reciprocatorily mounted through a cross member 43 and through the upturned base 44 of a U-shaped bracket 46 whose flanged arms 47 are connected with the cross member 43 by means of bolts 48 (paired) which are threadably received into the cross member 43.

Blade assembly 21 is here illustratively incorporated into apparatus 22 in the following manner. A supporting frame assembly is comprised of the U-shaped bracket 46 and the cross member 43. The cross member 43 at each opposed end region thereof is rotatably mounted in one of a pair of crank arms 49.

A drive means for reciprocatorily moving the blade member 23 is provided, and including power transfer means. Thus, in apparatus 22 the drive means is provided by a double acting pneumatic cylinder assembly 51 which is provided with a reciprocatable piston shaft 52 projecting axially therefrom. Cylinder assembly 51 is mounted in a stationary spaced position relative to cross member 43 by means of an L-shaped upstanding bracket member 53 having an upstanding arm 55 whose lower end portion is bolted by means of nut and bolt assemblies 54 to an upper portion of one arm 47. The base 56 of cylinder assembly 51 is secured to the base 57 of bracket 53 between downwardly projecting integral paired ears 58 thereof by means of a nut and bolt assembly 59 which extends through the ears 58 and base 56 and thereby locates the piston shaft 52 so as to be generally coaxial with the shaft 26. The forward end of the piston shaft 52 is threadably received in an appropriately threaded bore in the rear or uppermost end of the shaft 26 so that reciprocating movements imparted to the shaft 52 are directly imparted to the shaft 26.

A pear 42 or the like being halved and experiencing calyx removal by the practice of this invention with apparatus 22 is positioned in a holder 61 or the like, preferably with the axis of pear 42 generally coaxial with the axis 63 of shaft 26. Any convenient holding means may be employed, as those skilled in the art will appreciate.

Blade assembly 21 in an apparatus 22 can be used for halving and calyx removal of pears 42, as those skilled in the art will appreciate.

It is presently preferred to employ in the practice of the teachings of this invention, as a means for holding and supporting a pear or the like during a halving and calyx removing operation, a holder such as holder 61 (see especially FIGS. 1, 2, 4, 7 and 8). Such class of holder apparatus is more fully described in our copending U.S. application for patent filed on June 23, 1976 and identified as U.S. Ser. No. 698,798 and such holder apparatus is adapted to self center (relative to the holder axis) fruit members positioned therein without injury thereto. Briefly, each holder 61 is mounted upon an elongated flattened rigid flight strap member 102 which has spaced, generally parallel opposing faces. A holder 61 utilizes a cup member 103 which has an axis 104. Cup member 103 has a bottom wall 106, and integral, axially symmetrically upwardly extending, relatively deep side walls 107 which terminably define a radially outwardly flared, generally circular mouth region 108. The side walls 107 have defined therein a pair of opposed, axially extending slots 109 extending to bottom wall 106 from mouth region 108. Cup member 103 is here formed of a cast metal, such as an aluminum alloy, but cup members can be formed of stamped heavy gauge sheet metal, of plastic, or the like, as desired. Cup member 103 is spaced from strap member 103 by a mounting bar 109 which bears on the upper face thereof a majority of the functional components of holder 61. Cup member 103 is here secured to strap member 102 by a screw 111 which extends through the bar 109 and threadably engages strap member 102.

Figure 7:
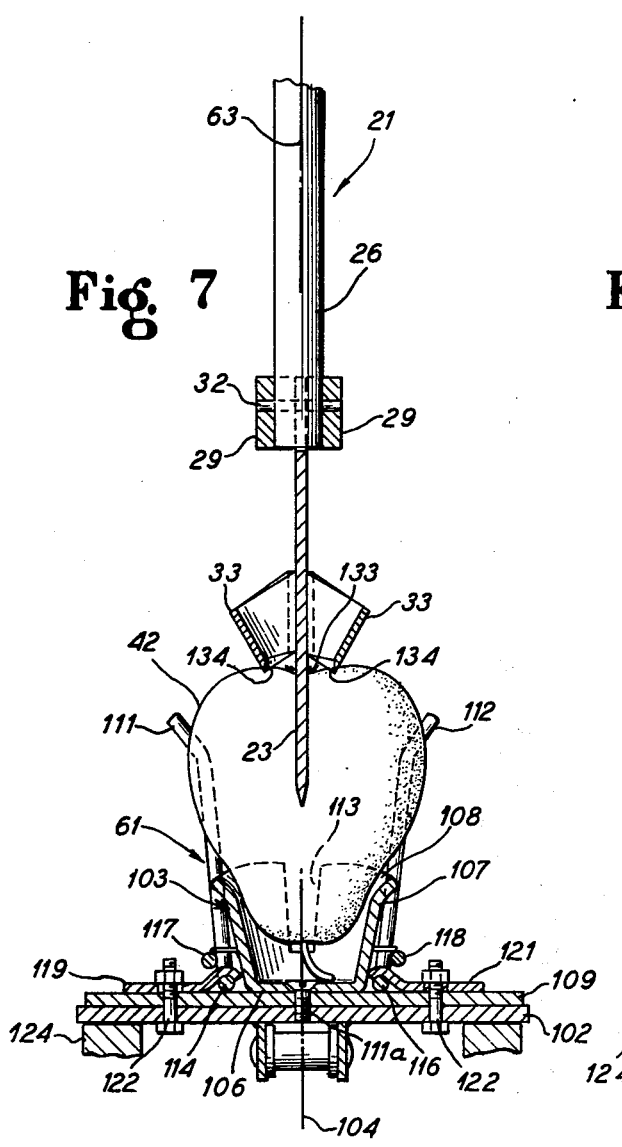
FIG. 7 is a fragmentary vertical sectional view in end elevation through the blade region of the embodiment shown in FIG. 1 showing the blade member thereof entered into a pear to position where cut-out of the calyx portions thereof is about to commence.
Figure 8:
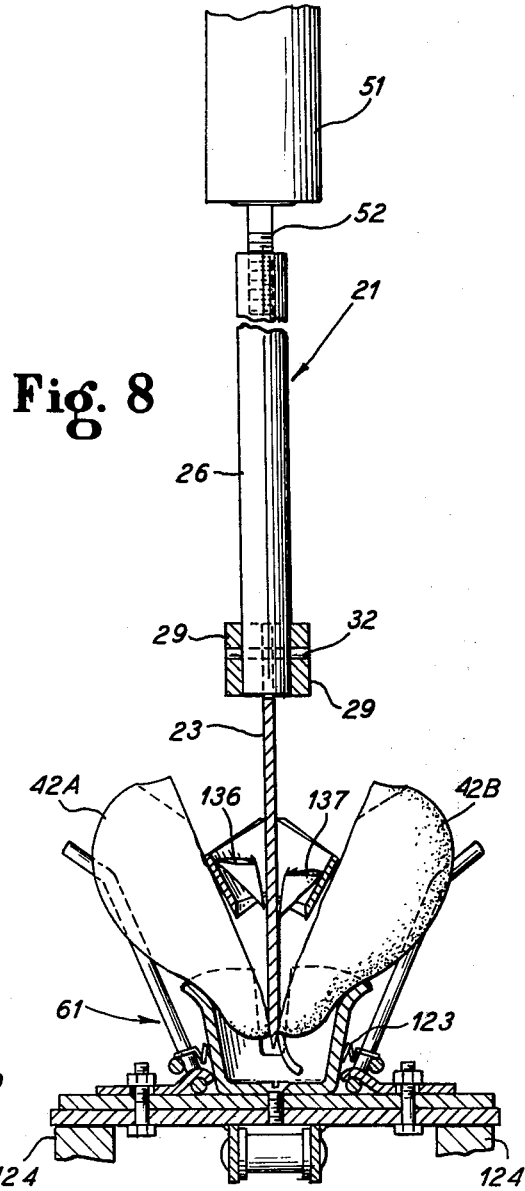
FIG. 8 is a view similar to FIG. 7 but showing such blade member at the bottom of its cycle of downward reciprocation with a pear fully cut into halves and with the calyx portions thereof fully cut away.

Each holder 61 is provided with a pair of axially upstanding rigid arms 111 and 112. Each arm 111 and 112 is located adjacent a different outside region of side walls 107 in opposed relationship to each other. Arms 111 and 112 are in circumferentially equally spaced relationship to the slots 113. As those skilled in the art will appreciate, the slots 113 are provided so as to permit the holder 61 to receive thereinto through the slots 113 a blade member 23 as such descends thereinto from an overhead position during processing, as taught by this invention, into engagement with fruit (such as pear 42 as shown in FIGS. 7 and 8).

In holder 61, each arm 111 and 112 is comprised of a forked member having a pair of circumferentially (relative to cup 103) spaced tines. The tines upwardly extend from a base 114 and 116 for each arm 111 and 112, respectively. The tines are in preferably spaced parallel relationship to one another. Each base 114 and 116 defines a cross brace between tines and further serves as a pivot axis for its respective associated arm 111 and 112. The outer terminal end portions of the respective tine pairs are outwardly flared for each rigid arm 111 and 112 for convenience in loading a holder 61 with a fruit piece, such as a pear 42. Each arm 111 and 112 is provided with a cross brace 117 and 118, respectively, located in spaced relationship to the base member 114 and 116, respectively, thereof which cross brace not only braces the individual tines of each arm 111 and 112, but further serves as a stop means limiting radially outward movement of each arm 111 and 112, among other functions.

A pair of retainer clips 119 and 121 are provided to serve as pivotal connecting means for a holder 61, one clip 119 being employed for arm 111 and the other clip 121 for arm 112. Fastening means securing each clip 119 and 121 to flight strap member 102 through the mounting bar 109 is here conveniently provided by nut and bolt assemblies 122. Preferably, the clips 119 and 121 are radially adjustable relative to axis 104 thereby permitting locating the position of each base 114 and 116 at an optimum position for the processing of any given type of fruit or the like, the choice of position in any given instance being dependent upon size, shape, processing conditions, equipment considerations, and the like.

The arms 111 and 112 are provided with springs 123 which yieldingly bias each arm 111 and 112 towards its associated region of the cup member 103, a pair of such springs 123 being employed for each holder 61.

For use, a fruit piece, such as a pear 42, is manually or mechanically pushed against the end regions of arms 111 and 112 which then spread radially so that the fruit such as pear 42 is permitted to descend generally along the axis 104 downwardly until such rests against the side walls 107 about the mouth region 108 of cup member 103. The lips defining the mouth region 108 are dished, preferably in the vicinity of the arms 111 and 112, to aid in the splitting and separation of halves, such as halves 42A and 42B in FIG. 8, from a holder 61 in accordance generally with the teachings of the present invention.

The manner in which a blade assembly 21 functions in an apparatus 22 in cutting longitudinally a pear 42 or the like may be understood by reference to FIGS. 7 and 8. Here, blade member 23 has entered a pear 42 along the axis thereof, and member 27 has moved, through force applied to the shaft 26 from cylinder 51 in the manner as herein described, downwardly into pear 42 to the position where the sheet-like members 33 are about to engage and cut into the pear 42 in the region thereof circumscribing calyx portion 133. The small mouth 37 of the conical region formed by sections 34 defined by the members 33 has an edge 134 defined on the rim thereof which extends parallely to the axis 63 of shaft 26; such a longitudinally straight but circumferentially curved edge 134 is advantageous because it enhances the desired camming action which commences inherently as the members 33 enter into the pear 42 in the region of calyx 133. Thus, as the blade member 23 continues to cut deeper into the pear 42 (see FIG. 7), and as the edge 134 moves into the body of pear 42 around the calyx 133, the outside faces of each member 33 in the conically tapered sections 34 thereof, respectively, function to push against adjacent pear surfaces thereby forcing such adjacent portions away from the region about the cutting edge 134 as such advances into pear 42. The result is that conically tapered portions 136 and 137 of pear 42 are cut away from the body of pear 42 in the vicinity of calyx 133 (see FIG. 8) as blade 23 descends through pear 42. The relationship between blade 23, members 33 and pear 42 is chosen so that preferably even before blade 23 reaches the bottom of its down stroke of reciprocation (first half of a full cycle of such reciprocation), pear 42 is completely divided into two separate halves 42A and 42B and the calyx portion 133 has been completely cut away therefrom. After completion of these dual operations, the blade member 23 and attached members 33 is withdrawn from the vicinity of halves 42A and 42B and the pear halves 42A and 42B are separated.

Apparatus 22 is adapted for incorporation into automatic, continuously operating pear splitter apparatus, the embodiment herein shown being designated in its entirety by the numeral 96, wherein each of a plurality of pears 42 and/or the like is translated row-wise generally transversely relative to the axis 63, of the shaft 26 sequentially along a fixed path. In such apparatus 96, the pears 42 are in generally equally spaced, longitudinally aligned relationship to one another in a row as respects the direction of such translation. A plurality of holders 61 are thus employed in apparatus 96, a different holder 61 being used for each individual pear 42 being processed therein.

An individual splitter apparatus 22 can be employed as an integral unit or subassembly in apparatus 96 wherein each holder 61 or the like is associated with a continuously moving conveyor assembly 62 which translates holders 61 sequentially into and away from predetermined positions of approximate transitory alignment generally of the axis of each holder 61 with the axis of shaft 26.

In another embodiment of an automatic halving and calyx removal system incorporating apparatus 22, a plurality of holders 61 are similarly associated with a conveyor assembly but here such conveyor assembly is adapted to translate the indicated plurality of holders in a noncontinuous manner sometimes termed in the art "stop and go" movement. In such other embodiment, the holder plurality is moved so that an individual holder comes into a predetermined position of alignment with the axis of shaft 26, and is held in such predetermined position for a predetermined interval of time while axis 26 undergoes a full cycle of reciprocation in which a fruit piece is halved and has its calyx removed. Then the holder means is translated away from such predetermined position and another holder means is moved into such predetermined position. Particularly for reasons associated with high operational capacity rates, it is preferred to utilize apparatus 22 with a system such as apparatus 96.

To operate a blade assembly 21 in an apparatus 22 incorporated into an apparatus 96, at the regular, sequential intervals needed for the individual slicing and calyx removal operations to be performed on each of a plurality of sequentially advancing pears or the like, control means must be incorporated into a splitter apparatus 96 which will automatically cause the blade assembly 21 to undergo one full cycle of reciprocation when each holder 61 or the like is translated by the continuously moving conveyor assembly 61 into a predetermined spatial position relative to such assembly 21. A preferred control means for synchronizing reciprocations of a shaft, such as shaft 26, relative to each of such a plurality of pears 42 or the like, which are advancing in generally equally spaced, longitudinally aligned relationship to one another as respects the direction of translation, is now described and such is herein designated in its entirety as synchronizing control means 97.

The support means comprised of cross member 43 and U-shaped bracket 46 for the shaft 26 is provided with guidance means for translating or moving such support means along a predetermined circular path. Such guidance means here includes the pair of crank arms 49. Each crank arm 49 is associated with a crank which is here wheels 66 (paired). Each wheel 66 is rigidly axially connected with a crank shaft 67 (paired).

In turn, each crank 67, at the opposite end from that to which it is connected with a wheel 67, is joined to a sprocket 68 (paired). Each sprocket 68 is thus adapted to drive each associated crank arm 49 revolvably about the axis of each wheel 66. Each shaft 67 is journalled for rotational movements by a pair of pillow blocks 69 (two pairs), the pillow blocks 69, in turn, being supported by and secured to a frame assembly 71. In effect, frame assembly 71 mounts the support means and the guidance means, as well as components associated therewith, including blade assembly 21, in a prechosen relationship relative to a row 72 of target areas (here a row of holders 42) with the axis 63 of shaft 26 and the edge 24 of blade member 23 being generally alignable with a line defined by the respective centers of the target regions (here the respective centers of holders 61), as such translate along their path of continuous movement.

Cylinder assembly 51 provides a drive means for driving reciprocatorily the plunger shaft 26 through predetermined cycles of reciprocal movement, and sprockets 68 provide a drive means for moving in a continuous manner the cross member 43 and components associated therewith along a circular path defined by the distance between the axis of each crank shaft 67 and the axis of the crank arm 49 associated therewith. Since the respective pairs of sprockets 68, drive shafts 67, wheels 66, and crank arms 49 are substantially identical to one another, the rotational driving of a sprocket 68, as with a roller chain 76, results in the rotating each crank arm 49 at an identical speed. In effect, the chain 76 provides a means for regulating the rate at which the sprocket drives 68 move the cross member 43 through successive complete circular cycles of movement thereof along its predetermined path.

To regulate operation of the cylinder assembly 51, a four-way valve assembly 72 is here provided. Valve assembly 72 is interconnected to the double acting pneumatic cylinder assembly 51 by appropriate conduits 73, such as plastic tubing or the like. The interrelationship between valve 72 and cylinder 51 is set so that fluidic pressures maintain the piston shaft 52 normally retracted interiorly into cylinder 51 until such time as valve switching button 74 is tripped whereupon fluidic pressures supplied to cylinder 51 by valve 72 are reversed, and valve 72 causes cylinder assembly 51 to extend the shaft 52 along the axis 63 thereby causing the shaft 26, in turn, to stroke downwardly to complete one half of a cycle of reciprocation of blade member 23. When exteriorly applied force upon button 74 is released, the fluidic pressures delivered by valve assembly 72 to cylinder assembly 51 revert to such normal or initial condition whereupon the shaft 52 is retracted interiorly into the cylinder 51 and the second half of a full cycle of reciprocation is completed for blade member 23. Button 74 thus in effect controls cylinder 51 operation.

In the conveyor assembly 62 of apparatus 96, each flight strap member 102 supports on an upper face thereof a single centrally located holder 61. The bottom face of each flight strap member 102 is centrally welded or otherwise secured transversely across a pair of outer straps forming part of a single link of a roller chain 77. The spacing between successive flight strap members 102 longitudinally along the chain 77 is influenced by the desired cycle time of the synchronizing mechanism and by the translational speed desired for conveyor assembly 62.

For purposes of functional mounting and positioning of chain 77, a sprocket 78 is fixedly axially mounted centrally on a shaft 79 which is journaled for axial rotational movements by bearings 81 and 82 that are, in turn, functionally associated with the frame assembly 71, the bearings 81 and 82 being located adjacent opposed end regions of shaft 79. Another sprocket 142 is similarly fixedly axially mounted centrally on a shaft 143, and shaft 143 is journaled for rotational movements by bearings 143 (paired) which are associated with frame assembly 71 and which are located adjacent opposed regions of shaft 143. The respective axes of shafts 79 and 143 are generally coplanar and in spaced, horizontal relationship to one another. Chain 77 is mounted circumferentially about and extended between sprockets 78 and 142.

To stabilize translational movement of holders 61 between sprockets 78 and 142 across the upper tangential distance therebetween, a pair of rails 124 are provided which are transversely spaced from one another on either side of chain 77 and mounted to the frame assembly 71. Each opposed end portion of each flight strap member 102, on the under face thereof to which is also secured roller chain 77, is brought into sliding engagement with a different one of such rails 124 as the holders translate.

Thus, the conveyor assembly 62 is translatably moved over rails 124 by a sprocket chain 77 which is driven at a linear speed corresponding to the translational speed desired for conveyor assembly 62. To drive chain 77, one end portion of shaft 79 has fixedly mounted thereon a sprocket 83.

Sprocket 83 is mounted so as to be aligned (coplanar) with sprocket 68, and a roller chain 77 is mounted or looped about circumferential portions of sprockets 83 and 68. To maintain a desired engagement with an appropriate circumferential region of each sprocket 68 idler sprockets 84 and 86 are provided, each being appropriately journaled for rotational movements relative to the frame assembly 71. To drive the sprocket chain 76 along its path engaging the sprockets 68 and 83, a drive sprocket 87 is aligned and engaged with a chain 76, as shown, for example, in FIG. 1. In turn, drive sprocket 87 is fixedly axially mounted on one end portion of a shaft 88. The drive shaft 88 is conveniently journaled in regions adjacent the opposed ends thereof by pillow blocks 89 (paired), the pillow blocks 89 being connected to the frame assembly 71. Adjacent the end of shaft 88 opposed to that on which sprocket 87 is connected, a driven pulley 91 is fixedly associated at the hub portion thereof. To rotatably drive driven pulley 91, a drive pulley 92 is provided in appropriate alignment with the driven pulley 91. To rotate the drive pulley 92, an electric motor 93 is provided which is integrally associated with a conventional gear reduction assembly 94 from which extends the drive shaft 96 on which the drive pulley 92 axially is fixedly mounted.

Thus, in apparatus 96, operation of the electric motor 93 drives the sprocket chain 76 which turns the crank arms 49 through their circular path, and, also, translates the conveyor assembly 62, as desired. Through appropriate sizing of the diameter portions of sprocket 83 relative to sprocket 68, as those skilled in the art will immediately appreciate, the time interval required for translation of a first holder 61 to a second holder 61 in relation to a prechosen location of shaft axis 63 is made equal to the time required for one complete 360° of translation of the support means or cross member 43, and parts associated therewith, along their circular path. The interrelationship between the diameter of sprocket 83 and the distance between the centers 10 of individual holders 61 is such that for each 360° of travel of cross member 43, and parts associated therewith, the conveyor assembly 62 advances exactly to the extent needed to translate the conveyor assembly 62 by a distance equal to the space existing between the axes 103 of holders 61. Once the apparatus 96 is initially assembled and adjusted so that an individual holder 61 has an alignable spatial relationship with axis 63, the relative spatial position of cross member 43 can be adjusted so that cross member 43 is at the bottom of its path of travel, and also is at a point which is in closest proximity to an individual holder 61 (and fruit held therein, such as pears 42) at the time when the axis 104 of each individual holder 61 is in a generally coaxial relationship with the axis 63 of shaft 26. The dimensions and spacings selected for the radius of travel of crank arms 49 relative to an individual holder 61 is such that the circular movement of cross member 43 does not bring the blade member 23 (and the cutting edge portion 24 thereof) into contact with individual target regions (e.g. pears 42) when the cross member 43 is at such closest point of approach. The size interrelationship between the various components, particularly the radius of travel associated with the crank arms 49, is such that, when the cross member 43 is moving in a generally horizontal direction during its bottommost arc of movement over such closest point of approach, the translational speed of cross member 43 is approximately that of the translational speed associated with the movement of the individual holders 61. Preferably, for a predetermined interval of time, the axis 63 of shaft 26 is kept in a nearly aligned relationship with an individual center 104 of each holder 61 (and any pear 42 held thereby). The size relationships are preferably such that the preferred relationship of holder axis 104 to shaft axis 63 is such that the two axes from about 10° to 20° of rotation of the individual arms 49, though shorter and longer space of intervals of rotational movement can be employed if desired in any given instance.

The time of one full cycle of operation of synchronizing control means 97 is defined by the time required to produce 360° of rotation of each of the crank shafts 67. For an interval of time not greater than the period of a full cycle time, the plunger shaft 26 undergoes a full cycle of reciprocation as driven by the cylinder assembly 51. The time of one full cycle of reciprocation of shaft 26 is preset and is typically and preferably substantially less than one full cycle time. Preferably and commonly, in the operation of the synchronizing control means 97, the preset time is not greater than about 10% of the full cycle time. Initiation and duration of a cycle of reproduction of shaft 26 is controlled by cam member 98 which is mounted about and secured to shaft 88 so that the lobe 99 of cam member 98 is aligned with the spatially fixed orientation of button 74. Thus, as shaft 88 revolves, cam lobe 99 once during each revolution of shaft 88 engages button 74 and initiates appropriate fluidic pressures in cylinder assembly 51 causing one full cycle of reciprocation of shaft 26. As those skilled in the art will appreciate, once the button 74 is compressed by cam lobe 99, the speed at which, and the time required for, one half of a full cycle of reciprocation of shaft 26 is determined by equipment parameters associated with the response characteristics inherent in the particular cylinder assembly 51 and valve assembly 72 employed in any given situation. The time at which a blade member 23 remains as the bottom or full extent thereof at the end of one half of a full cycle of reciprocation is determined by the time which cam lobe 98 engages button 74. Once such engagement ceases, the time for retraction of the shaft 52 and completion of the second half of a full cycle of reciprocation of shaft 26 is set likewise by equipment parameters. In the embodiment shown, it is preferred to have a cycle of reciprocation commence shortly before a target area (e.g. a pear 42) has its center in a generally aligned relationship with axis 63 of shaft 26, and it is further preferred to have the blade member 23 withdrawn from a pear 42 at a time when the pear 42 or holder 61 has gone only a short distance beyond the position of coincidence of shaft axis 63 with region or holder center 61.

Figure 9:
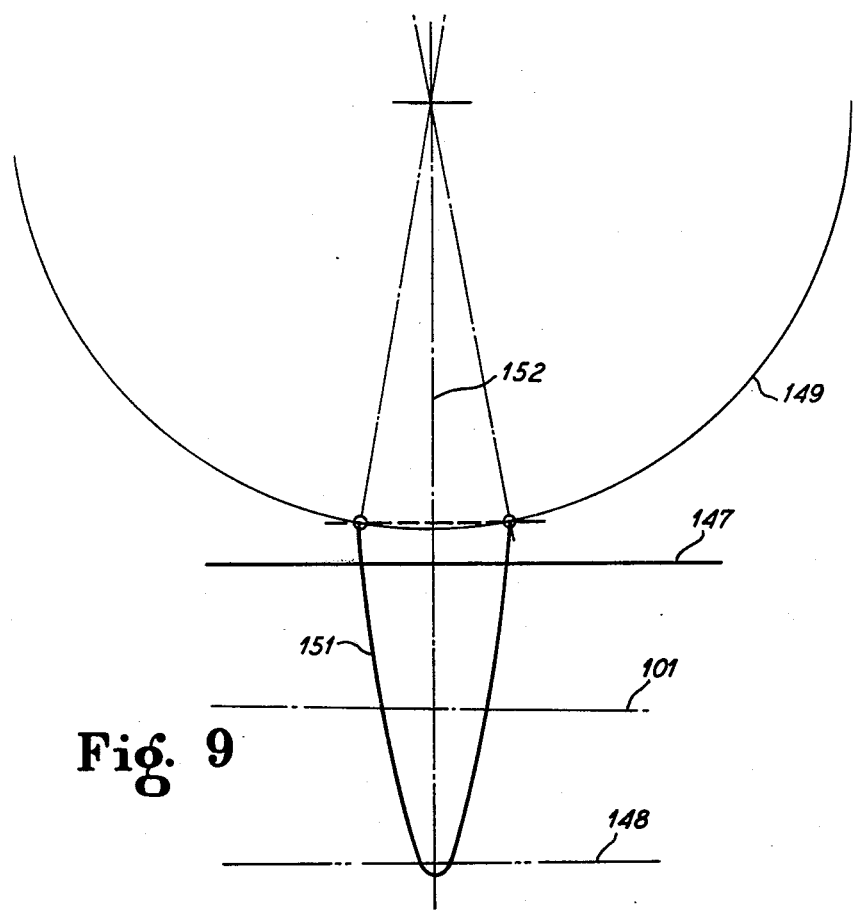
FIG. 9 is a diagrammatic view illustrating the relationship between the path of travel of a pear, the path of travel of the cross-member. and the path of travel of a blade edge during one cycle of operation of the embodiment of FIG. 1.

The interrelationship between the hypothetic line 101 (which is the center line between the top half 147 defined by pears 42 and the bottom line 148 defined by holders 61), the line 149 defined by edge 24 at axis 63 as cross member 43 pursues its circular path, and the line 151 defined by the bottom edge 24 at axis 63 during a cycle of reciprocation is illustrated in FIG. 9 for one preferred working interrelationship of such components in an apparatus 96. Line 152 can be considered to represent axis 63 at its lowermost point of movement as cross member 43 moves.

In one preferred mode of operation for a synchronizing control means 97, it is preferred, for a time period (which can be termed the approach time period) that is not less than about 2% of the full cycle time, to have the plunger axis 63 spatially translate in a spaced relationship to the path of translation of targets or holders 61 at a minimal spacing distance from line 101. This minimal spacing distance preferably varies by not more than about 15% above and/or below the line 149 described by the axis 63 during translation thereof over such approach time period (not counting line 151). During this time period the translation speed of holders 61 approximates the circumferential speed of axis 63 preferably.

Frame assembly 71 is comprised of a plurality of angle iron segments welded together at points of intersection in a conventional manner.

Idler sprocket 86 is adjustably mounted by means of a nut and bolt assembly 131 extending through a slotted aperture formed in frame assembly 71 so as to permit a take-up of slack and an adjustment of tension in the roller chain 76, as desired.

Figure 10:
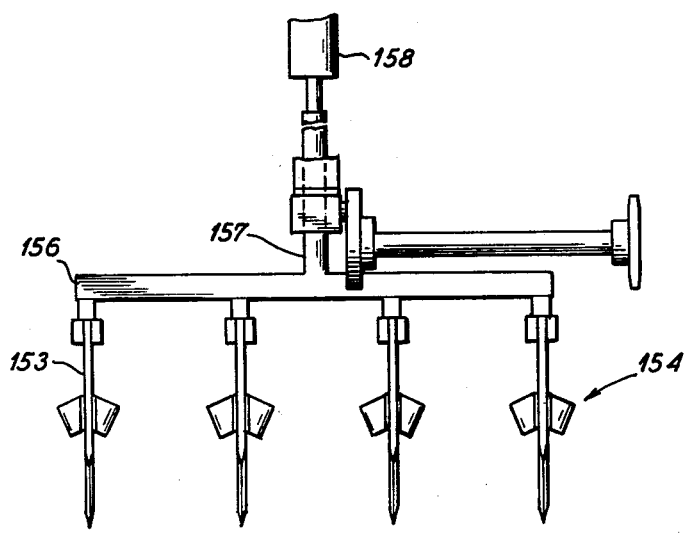
FIG. 10 is a simplified view illustrating another embodiment of halving and calyx removing apparatus of the present invention.

If desired, an automatic continuously operating pear processing apparatus of the present invention can be formed with a plurality of holders mounted in gangs upon individual flight strap members. In such an arrangement, the transverse spacing between individual holders on a given flight strap member is generally equal as respects the distance between holder centers. When, as shown in FIG. 10, such a gang of holders is employed, as those skilled in the art will readily appreciate, a gang of blade assemblies 154 are employed in tranasverse respective alignment with one another, one assembly 154 being provided for each row of holders being translated therebeneath. Such a gang of blade assemblies 154 can be operably reciprocably moved from a single holding bar 156. Such holding bar 156 is actuated by a single plunger shaft 157 which is adapted to reciprocate with the air of cylinder 158. Hence, the synchronizing control means 97 can be employed to operate a plurality of individual blade assemblies 153 for such a ganged apparatus 170 of this invention.

In the embodiment of the pear splitter of halving apparatus 96 shown, the pear halves 42A and 42B are retained in a holder 61 as it continues its translation away from the vicinity of a blade assembly 21. As a holder 61 with pear halves 42A and 42B therein leaves the vicinity of blade assembly 21, the end of the transverse, horizontal direction of holder 61 movement is reached, and the conveyor roller sprocket chain 77 moves each holder 61 successively through a curved path of descent, the start of which is illustrated for a holder 61a in FIG. 1. Here, the pear halves 42A and 42B fall by gravitational force away from each holder 61, such as holder 61a, into a shute 136, and the pear halves slide down the walls 137 of shute 136 onto, for example, a vibrating conveyor belt 138 which can be conventional in construction and which forms no part of the present invention as such.

Since the calyx region portions of a pear removed by the knives formed by the sheet-like members 33 have inherently maximum widths no greater that that associated with the small mouths 37, the great majority of the calyx portion pieces 136 and 137 simply drop out through the mouths 37. Should any retension of such pieces be experienced, however, an overflow of such pieces 136 and 137 over the top of large mouth 41 of such conically tapered sections 34 takes place which does not interfere with operations.

The calyx pieces such as 136 and 137 after removal from a pear 42 simply drop down past the chain 77 onto the vibrating conveyor 138. The vibrating conveyor 138 has relatively large openings defined in the surface portions thereof through which such calyx pieces as 136 and 137 fall leaving retained on such conveyor the individual pear halves such as halves 42A and 42B which then move on the conveyor away from the vicinity of the apparatus 96. A bin or the like may be provided beneath the vibratory conveyor 138 at apparatus 96 to catch the calyx pieces.

The total number of flight strap members 102 employed in apparatus 96 is dependent among other factors upon the length of the conveyor roller chain 77 employed. It is presently convenient and preferred to have the conveyor assembly 62 so constructed that for each pear 42 or the like undergoing a splitting (halving) and calyx removal operation, there are three or four other holders 61 loaded with pears 42 in line and ready for sequential advancement into a machine operating position for purposes of pear cutting and calyx removal. Preferably, the loaded fruit in each holder 61 is maintained with all loaded holders 61 in a horizontal configuration. Preferably all holders are adapted to be self-centering, as is the case with holder 61, so that individual pears 42 or the like loaded thereinto are automatically centered.

It is preferred to utilize in the practice of this invention either single row systems of holders 61 and blade assembly 21, holders 61 continuously moving into and under a blade member 23, as herein described, or two gangs (or four gangs thereof), of holders 61 with two (or four) gangs of blade assemblies 21. Two gang systems can be conveniently loaded by a single operator using both hands, and a four gang system can be readily handled by two operators, each using both hands to load the apparatus, as from one or more bins.

While, after a halving and calyx removing operation, and as the conveyor assembly 62 and individual flight strap members 102 move over the sprocket 78, most pear halves, such as halves 42A and 42B, simply drop away from individual holders 61, occasionally, however, pear, apple or other fruit halves may tend to cling to a holder 61. To avoid this possible contingency, it is convenient and preferred to equip apparatus of this invention with an extractor plate 144, there being one such extractor plate 144 for each row of sequentially translating and moving holders 61. The plate 144 is adapted to fit stationarily beneath rails 124 between arm pairs 111 and 112, as illustrated for example, in FIG. 2. The holders 61 with stuck pear halves move against plate 144 and the halves are dislodged from an individual holder 61, as those skilled in the art will appreciate.

To aid in stabilizing reciprocal movements of shaft 26, the cross member 43 is here provided with a guidance extension member 126. To limit any tendency towards rotational movement of shaft 26 relative to cross member 43, a keying guide 127 is clamped circumferentially rigidly about shaft 26 and a terminal tongue portion of keying clamp 127 which radially extends outwardly from the shaft 26 is adapted to ride in a slot defined in one arm 47 and an arm rigidifying member 128, the slot defined thereby extending in spaced parallel relationship to the axis 63 of shaft 26. Motor 93 is mounted to frame assembly 71 through brackets 129.

As can be seen from the preceding description, an apparatus for continuously and sequentially halving and removing the calyx portions of each of a plurality of fruit items, such as pears or the like, utilizes conveyor means, a blade assembly, a blade assembly moving means, and synchronizing control means. The conveyor means continuously moves at a prechosen, generally constant speed, the items in sequential, equally spaced relationship to one another in a translation path past a prechosen position with the longitudinal axes of such items being generally perpendicular to such translation path. Such conveyor means includes drive means therefor.

The blade assembly includes blade means adapted for concurrent halving and calyx removal during a single passage of such blade means through such an item along the longitudinal axis thereof. The blade assembly includes support means therefor and reciprocatory drive means for reciprocatorily moving such blade means.

The blade assembly moving means moves the blade assembly in a circular path in spaced, generally coplanar relationship to such translation path. The blade assembly moving means includes drive means therefor.

The synchronizing control means interconnects the conveyor means, the blade assembly, and the blade assembly moving means. The synchronizing control means makes the time period needed for individual ones of said items associated with the conveyor means to move past the axis of such circular path equal to the time period needed for one 360° passage of such blade assembly about such circular path. Also, the control means makes the blade means undergo over a predetermined time interval one predetermined cycle of reciprocation commencing with such blade assembly has moved on such circular path to a position of predetermined proximity to such circular path.

As can also be seen from the preceding description, the present invention provides a process for treating pears and the like involving as one step the aligning of the longitudinal axis of a pear or the like with the axis of a reciprocatable blade member having a bottom edge and a pair of sheet-like members associated therewith, each such sheet-like member conforming generally to a hemi-conically tapered section in a mid region thereof, said sheet-like members defining together a conical section with said blade member extending transversely therebetween and oriented with said edge portion being adjacent the small mouth of said conical section. In another step, after such an alignment, the blade member is moved along the longitudinal axis of the pear through such pear so as to both halve the pear and remove the calyx portions therefrom.

The present invention further provides a process involving (a) continuously moving at a prechosen generally constant speed fruit items, such as pears, apples or the like, in sequential, equally spaced relationship to one another in a translation path past a prechosen position with the longitudinal axes of such items being perpendicular to such path, (b) continuously moving a blade assembly adapted for halving and calyx removal of such a fruit item, such continuous moving carrying such blade assembly in a circular path located in spaced relationship to such translation path and generally coplanar with such pear axes, and (c) Intermittently reciprocating such blade means at a prechosen time and speed along a blade axis extending in a direction generally parallel to the pear axes whenever the blade axis is in a prechosen proximity to an individual one of the pear axes, thereby halving and removing the calyx portion from an individual one such fruit item such as a pear or the like.

Other and further embodiments and variations of the present invention will be apparent to those skilled in the art from the present specification and drawings without departing from the spirit and scope of the present invention.

We claim:

1. A blade assembly adapted for incorporation into a splitter for pears and the like comprising (A) a rigid flattened blade member having a cutting edge portion defined on a side thereof for splitting a pear,
    (B) a shaft support means, including means associating same with said blade member,
    (C) guidance means allowing reciprocal movements of said blade member generally in the plane defined thereby in a direction generally transverse to said edge portion,
    (D) a pair of sheet-like members each conforming generally to a tapered section with the smaller edge thereof having a cutting edge surface defined therealong for removing the calyx region of a pear is split,
    (E) mounting means securing each one of said sheet-like members in opposed relationship to the other thereof and to said blade member with said respective tapered sections defining together generally a conical section and with said blade member extending transversely therebetween, the taper of said conical section extending generally towards said cutting edge portion, said conical section being oriented with said smaller circular edges thereof being in spaced relationship to said cutting edge portion.

2. A splitter apparatus for pears and the like comprising (A) a supporting frame assembly,
    (B) a blade assembly comprising a flattened blade member for splitting a pear, a blade shaft support means associated therewith, and associated bearing means for supporting and guiding said blade shaft support means during reciprocal movements of said blade member relative to an edge portion thereof in a plane generally defined thereby,
    (C) drive means for so reciprocally moving said blade member, including transfer means functionally associating said drive means with said blade shaft including actuation means therefor,
    (D) holder means for positioning and supporting a pear or the like generally axially of said blade shaft,
    (E) a pair of sheet-like members each conforming generally to a tapered section with the smaller edge thereof having a cutting edge surface defined therealong for removing the calyx region of a pear as said pair is split,
    (F) mounting means securing each one of said sheet-like members in opposed relationship to the other thereof and to said blade member with said respective tapered sections defining together generally a conical section and with said blade member extending transversely therebetween, the taper of said conical section extending generally towards said cutting edge portion, said conical section being oriented with said smaller circular edges thereof being in spaced relationship to said cutting edge portion.

3. The splitter of claim 2 wherein said holder means is associated with continuously moving conveyor means which translate said holder means into and away from a predetermined position.

4. The splitter of claim 2 wherein said holder means is associated with moving conveyor means which translates said holder means into a predetermined position, then holds said holder means in said predetermined position for a predetermined interval of time and then translates said holder means away from said predetermined position.

5. The splitter of claim 3 additionally incorporating control means which automatically causes said blade assembly to undergo one cycle of reciprocation when said holder means is translated by said moving means into said predetermined position.

6. The splitter of claim 4 additionally incorporating control means which automatically causes said blade assembly to undergo one cycle of reciprocation when said holder means is translated by said moving means into said predetermined position.

7. Automatic continuously operable apparatus for sequential halving and calyx removal of each of a plurality of pears or the like comprising (A) a supporting frame assembly,
    (B) a blade assembly comprising a flattened blade member for splitting a pear, a blade shaft means associated therewith, and associated support means for supporting and guiding said blade shaft during reciprocal movements of said blade member relative to an edge portion thereof in a plane defined thereby,
    (C) first drive means for so reciprocally moving said blade member through predetermined cycles of reciprocal movement, including transfer means functionally associating said drive means with said blade shaft,
    (D) a plurality of holder means, each adapted for positioning and supporting a pear or the like generally axially of said blade shaft,
    (E) a pair of sheet-like members each conforming generally to a tapered section with the smaller edge thereof having a cutting edge surface defined therealong for removing the calyx region of a pear as said pear is split, (F) mounting means securing each one of said sheet-like members in opposed relationship to the other thereof and to said blade member with said respective tapered sections defining together generally a conical section and with said blade member extending transversely therebetween, the taper of said conical section extending generally towards said cutting edge portion, said conical section being oriented with said smaller circular edges thereof being in spaced relationship to said cutting edge portion (G) continuously movable conveyor means for translating each of said holder means in a fixed path into and away from a predetermined position beneath said flattened blade member, (H) control means for synchronizing reciprocations of said blade shaft means relative to each of said holder means as such continuously translate generally tranversely relative said shaft means by said conveyor means, said holder means being in generally equally spaced, longitudinally aligned relationship to one another as respects the direction of such translation.

8. The apparatus of claim 7 wherein said control means includes:

(A) guidance means for translating said support means along a predetermined circular path functionally associated with said support means, (B) said frame assembly including frame means mounting said support means and said guidance means in a prechosen relationship to said plurality of holder means with the axis to blade shaft means being generally alignable with a line defining respective centers of said holder means, as said holder means so translate along said path, (C) second drive means for translating said support means along said circular path in a continuous manner, (D) first regulator means functionally associated with said first drive means for operating said drive means to produce individual ones of said cycles of reciprocal movement of said plunger shaft, (E) second regulator means functionally associated with said second drive means for regulating the rate at which said second drive means so translates said support means through successive complete translations of said support means along said path, (F) third regulator means for regulating the rate at which successive ones of said predetermined positions translate along their fixed path, and (G) means which
(1) functionally interconnects said second and said third regular means for making the time interval required for translation of a first said holder means to a second said holder means in the general vicinity of said blade shaft axis be equal to the time interval required for one complete translation of said support means along said circular path,
(2) functionally interconnects said first regulator means with said second and said third regulator means for making said blade shaft means undergo one complete said cycle of reciprocal movement over a preset time period which occurs once within each such time interval, commencing at a preset instant, and
(3) functionally interconnects said second and said third regulator means for making said blade shaft axis at said plunger shaft end be generally axially aligned with an individual holder means when said support means is at a prechosen place along said circular path.

9. The apparatus of claim 7 wherein said control means includes (A) a pair of crank assemblies, each one including a crank arm and crank shaft means adapted to move said arm revolvably about a crank axis, including crank shaft journaling means, the respective crank arms of said pair each being oriented with said crank axes in spaced, parallel relationship to each other and with the axis of each said crank arm adapted to be in equally spaced parallel relationship to the other thereof as said arms move revolvably, (B) second drive means for rotating each of said crank shafts at the same speed, (C) a cross member extending between said arms, including cross member journal means journaling said respective arms with respect to said cross member as said arms move revolvably, said cross member having a cross axes extending between said arm axes, including bracket means associated therewith, (D) said blade assembly being held by said cross member (E) said frame assembly including frame means mounting said means in fixed relationship to said cross member with the blade shaft means axis being generally aligned with said first drive means, (F) third drive means for said conveyor means, (G) speed synchronizing means for coordinating the rotational speed of said second drive means with the linear speed of said holder means and adapted to produce 360° of rotation of each of said crank shaft means for each spaced distance interval between respective centers of said holder means, thereby defining the time of one full cycle of operation of said control means, (H) said frame assembly including support means mounting said crank axes in fixed relationship to said path when said blade shaft means in a prechosen alignable relationship relative to said holder means, (I) regulator means adapted to reversably control said first drive means responsive to actuation means integrally associated therewith, (J) operating means functionally associated with said speed synchronizing means and adapted to operate said regulator means cyclically once over a preset time interval during each 360° of rotation of each of said crank shaft means when said cross member is in a predetermined spatial position relative to individual ones of said holder means.

10. A blade assembly adapted for incorporation into a splitter for pears and the like comprising (A) a rigid flattened blade member having a cutting edge portion defined on a side thereof for splitting a pear, (B) a pair of sheet-like members each conforming generally to a tapered section with the smaller edge thereof having a cutting edge surface defined therealong for removing the calyx region of a pear as said pear is split, (C) mounting means securing each one of said sheet-like members in opposed relationship to the other thereof and to said blade member with said respective tapered sections defining together a conical section and with said blade member extending transversely therebetween, the taper of said conical section extending generally towards said cutting edge portion, and said conical section being oriented with said smaller circular edges thereof being in spaced relationship to said cutting edge portion.

* * * * *